(12) United States Patent
Collins

(10) Patent No.: US 7,722,956 B2
(45) Date of Patent: May 25, 2010

(54) GLASS PANEL

(75) Inventor: Richard Edward Collins, Sydney (AU)

(73) Assignee: University of Sydney, Sydney, New South Wales (AU)

( * ) Notice: Subject to any disclaimer, the term of this patent is extended or adjusted under 35 U.S.C. 154(b) by 0 days.

(21) Appl. No.: 11/448,202

(22) Filed: Jun. 7, 2006

(65) Prior Publication Data

US 2006/0228500 A1 Oct. 12, 2006

Related U.S. Application Data

(60) Division of application No. 10/010,435, filed on Dec. 7, 2001, now Pat. No. 7,081,178, which is a continuation of application No. PCT/AU00/00637, filed on Jun. 7, 2000.

(30) Foreign Application Priority Data

Jun. 10, 1999 (AU) .................................. PQ 0902

(51) Int. Cl.
 B32B 17/06 (2006.01)
 E06B 3/00 (2006.01)
 E04C 2/54 (2006.01)

(52) U.S. Cl. .................. 428/426; 428/34; 428/427; 428/428; 52/786.1; 52/786.13

(58) Field of Classification Search ............... 428/34, 428/120, 426, 427, 428; 52/786.1, 786.13
See application file for complete search history.

(56) References Cited

U.S. PATENT DOCUMENTS

| 2,936,923 | A | * | 5/1960 | Veres ..................... 220/2.1 A |
| 3,948,433 | A | * | 4/1976 | Palmers ..................... 228/230 |
| 4,450,441 | A | * | 5/1984 | Person et al. ................. 345/66 |
| 4,853,264 | A | * | 8/1989 | Vincent et al. ................ 428/34 |
| 5,643,644 | A | * | 7/1997 | Demars ....................... 428/34 |
| 5,766,053 | A | * | 6/1998 | Cathey et al. ................. 445/25 |

OTHER PUBLICATIONS

BE 794969A, Nov. 1973, Abstract only.*

* cited by examiner

*Primary Examiner*—Donald Loney
(74) *Attorney, Agent, or Firm*—Fitch, Even, Tabin & Flannery

(57) ABSTRACT

A panel comprises two confronting glass sheets 12, 14 that are hermetically sealed together by a solder glass 10, with the hermetic seal 18 comprising remelted solder glass.

14 Claims, 2 Drawing Sheets

GLASS PANEL

CROSS-REFERENCE TO RELATED APPLICATIONS

This is a division of U.S. patent application Ser. No. 10/010,435, filed Dec. 7, 2001 now U.S. Pat No. 7,081,178, which is a continuation of International Patent Application PCT/AU00/00637, designating the United States, having an International filing date of Jun. 7, 2000, which claims priority to Australian Application No. PQ 0902, filed on Jun. 10, 1999, which are hereby incorporated herein by reference in their entirety.

FIELD OF THE INVENTION

The present invention relates broadly to glass panels which comprise spaced-apart edge sealed glass sheets. The present invention will be described herein with reference to vacuum glazing, however, it will be appreciated that the present invention does have broader applications including, for example, in automobile windows, glass panel displays or solar collector panels.

BACKGROUND OF THE INVENTION

Hermetic seals which are suitable for use in vacuum glazing typically involve the use of solder glass, which is also referred to as glass frit. The term "solder glass" refers to a glass which melts and softens at a lower temperature than the glass sheets of the glazing, but which has a coefficient of thermal expansion which closely matches that of the glass sheets. As such, a suitable solder glass will depend upon the glass used for the glass sheets of the vacuum glazing. A typical example of glass used for vacuum glazing is soda lime glass.

The use of solder glass has the advantage that, unlike other solders such as metal solder, it is "compatible" with the glass sheets. For example, bonds between the solder glass and the glass sheets can be formed by inter-diffusion. At the same time, the solder glass is impermeable so that a low pressure within the internal volume of vacuum glazing can be maintained indefinitely for all practical purposes.

To form an hermetic seal between two glass sheets of a vacuum glazing, solder glass, normally in the form of a viscous liquid paste containing solder glass powder, is provided around the edges of the glass sheets, which are positioned in a spaced apart relationship, e.g. by way of support pillars placed between the sheets. The entire structure is then heated to a temperature at which the solder glass melts and whilst in its molten state, flows by capillary action between the spaced apart sheets and diffuses into the atomic structure of the respective glass surfaces, forming a strong and leak free joint between them.

Although the temperature at which the edge seal process occurs is less than that at which the glass sheets soften and melt, it is in general necessary for the temperature at which the sealing process occurs to be such that the glass sheets are quite close to the point at which softening and distortion occur. In other words the influence of the heating on the glass sheets cannot be ignored for all purposes.

As an example, the temperatures necessary to form the seal with the process described above can result in a significant relaxation of internal stresses in the glass sheets. Treatment of the glass sheets at such temperatures for that purpose is commonly referred to as annealing. Although the annealing may result in the removal of unwanted stresses in the glass sheets for some applications, for other applications the removal of residual stresses during the formation of the solder glass seal is undesirable. As an example, it is often required that the glass in windows and doors should be tempered or heat strengthened. Tempered glass contains internal stresses which need to be retained to maintain the increased strength of the glass sheet.

Since a significant stress relaxation in the glass sheets cannot be avoided during the forming of the hermetic edge seal made from solder glass as described above, it has up until now been impossible to manufacture vacuum glazing which incorporates an hermetic edge seal made from solder glass and which utilise (fully) heat strengthened glass.

SUMMARY OF THE INVENTION

The present invention may be defined broadly as providing a method of constructing a glass panel which comprises two confronting edge sealed glass sheets. The method comprises the steps of providing a solder glass band around the margin of one surface of each glass sheet; forming, at a first temperature, an hermetic bond between the solder glass band and the associated surface of each glass sheet; positioning the glass sheets in spaced-apart confronting relationship; forming, at a second temperature which is lower than the first temperature, an hermetic seal between the two solder glass bands whilst maintaining the spaced apart relationship between the glass sheets.

In one embodiment, the step of forming the hermetic seal between the solder glass bands comprises fusing together the two solder glass bands to form an hermetic bond directly between those bands.

Alternatively, the step of forming the hermetic seal between the two solder glass bands comprises interposing solder glass between the two solder glass bands and fusing the solder glass with the two solder glass bands.

The temperature and time for forming the hermetic bond between the solder glass band and at least one of the glass sheets is preferably selected such that tempering of the glass sheet will be effected.

Support pillars may be used to maintain the glass sheets in the spaced apart relationship.

The method does have an application in vacuum glazing, in which case the method further comprises the step of evacuating the hermetically sealed space between the two glass sheets.

Preferably, the step of providing the marginal solder glass bands comprises depositing a liquid paste comprising solder glass powder onto the surfaces.

The solder glass may alternatively be deposited using different techniques, including deposition by a screen printing process or deposition as a pre-formed film or tape.

During the forming of the hermetic seal between the two solder glass bands, a spacing between the glass sheets may change compared to the situation when the glass sheets are positioned in the spaced-apart confronting relationship.

The glass sheets may be flat or curved and may be of any circumferential shape.

The present invention may also be defined in terms of a glass panel which comprises two confronting edge sealed glass sheets, in which the edge sealing is being effected by the above defined method.

Preferred forms of the invention will now be described, by way of example only, with reference to the accompanying drawings.

DETAILED DESCRIPTION OF THE PREFERRED EMBODIMENTS

Figure 1:
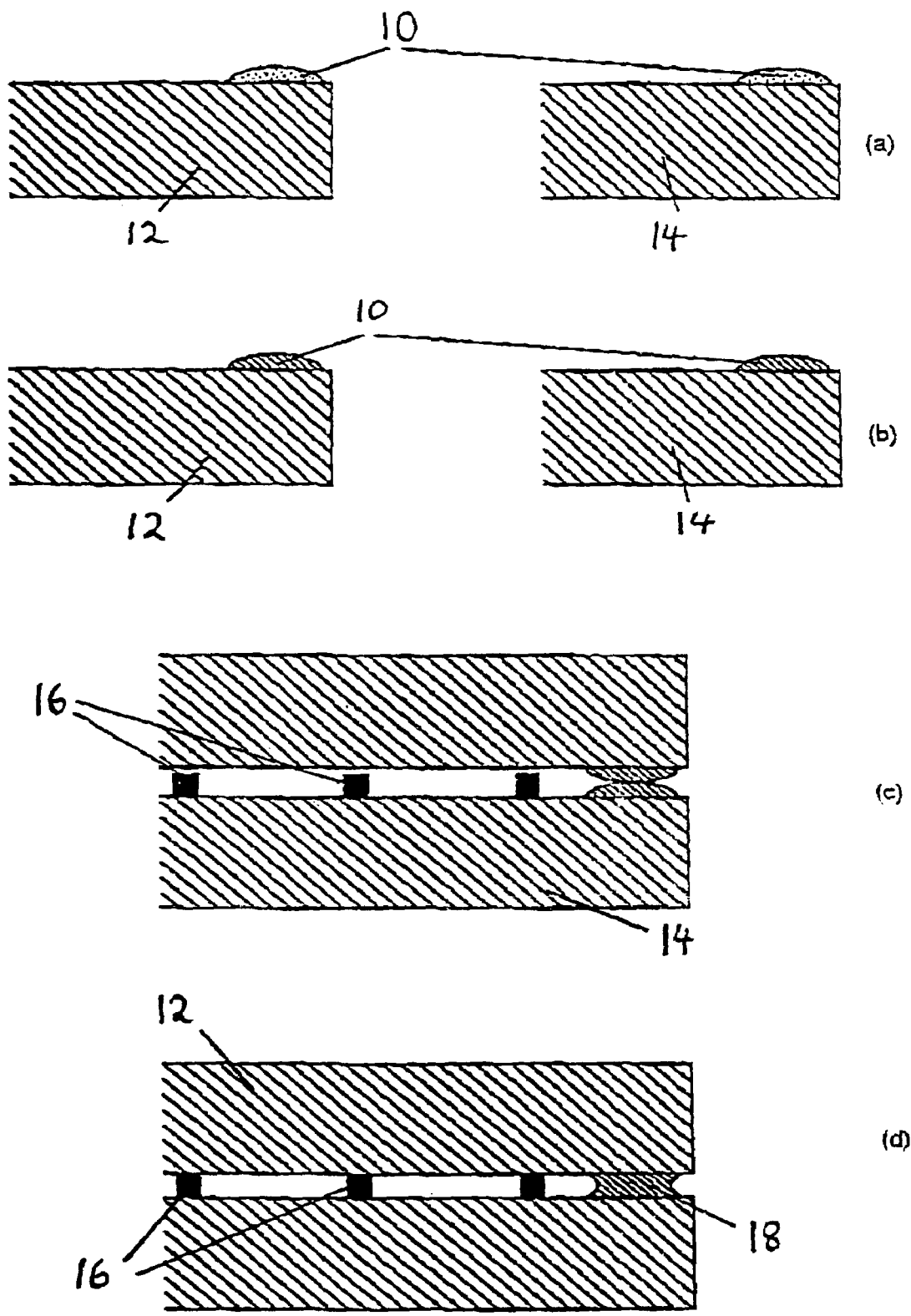
FIG. 1 is a schematic drawing illustrating a method of forming a glass panel embodying the present invention.

We seek to manufacture a glass panel comprising two confronting edge sealed glass sheets. In FIG. 1(a) liquid solder glass 10 is deposited as marginal bands on the surfaces of two glass sheets 12, 14. In FIG. 1(b) the glass sheets 12, 14 are then tempered to establish the necessary stresses within the glass sheets 12, 14 for heat strengthening the same. During the tempering process, the solder glass 10 melts and forms an hermetic bond to the surface of the glass sheets 12, 14. This bond is achieved by interdiffusion of the atoms of the solder glass 10 and the glass sheets 12, 14, typically over a distance of approximately 0.1 µm. As the temperature is decreased at the end of the tempering process, the solder glass solidifies.

The two tempered glass sheets are then assembled into a configuration illustrated in FIG. 1(c), with the bands of solidified solder glass 10 being positioned on top of each other. In the configuration illustrated in FIG. 1(c), an array of support pillars 16 has been provided on the bottom glass sheet 14. The sum of the thicknesses of the two bands of solidified solder glass 10 is slightly greater than the height of the support pillars 16. During a second heating process, the bands of solidified solder glass 10 are softened and melted sufficiently to form a hermetic seal between them. At the required temperature, the solder glass 10 softens sufficiently that it deforms, permitting the upper glass sheet 12 to move towards glass sheet 14 until it contacts the support pillars 16, as illustrated in FIG. 1(d). After cooling down from the second heating process, a hermetic seal 18 exists between the edges of the glass sheets 12, 14 around their periphery. The second heating process occurs at a lower temperature, and for a shorter time, than is necessary to produce the hermetic bond between the solder glass 10 and the glass sheets 12, 14 during the first heating process (FIG. 1(b)), with the temperature of the second heating process being sufficiently low to avoid a significant relaxation of the stresses within the glass sheets 12, 14 to maintain their heat-strengthened property.

The bands of solidified solder glass 10 melt and fuse into a non-porous material during the second heating process, and fuse to each other at a lower temperature than that required for significant interdiffusion to occur between the atoms of the bands of solder glass 10 and the glass sheets 12, 14.

For glass sheets made from soda lime glass, the solder glass used would for example have a "conventional" specification of being fusible with soda lime glass at 450-480° C. for one hour, or at higher temperatures for a shorter time. The tempering process will be chosen to cover those specifications. However, the second heating process, i.e. the fusing of the bands of solder glass 10, can be performed at 440° C., preferably 350° C. for one hour, thereby avoiding a significant stress relaxation in the tempered glass sheets during the second heating process.

Figure 2:
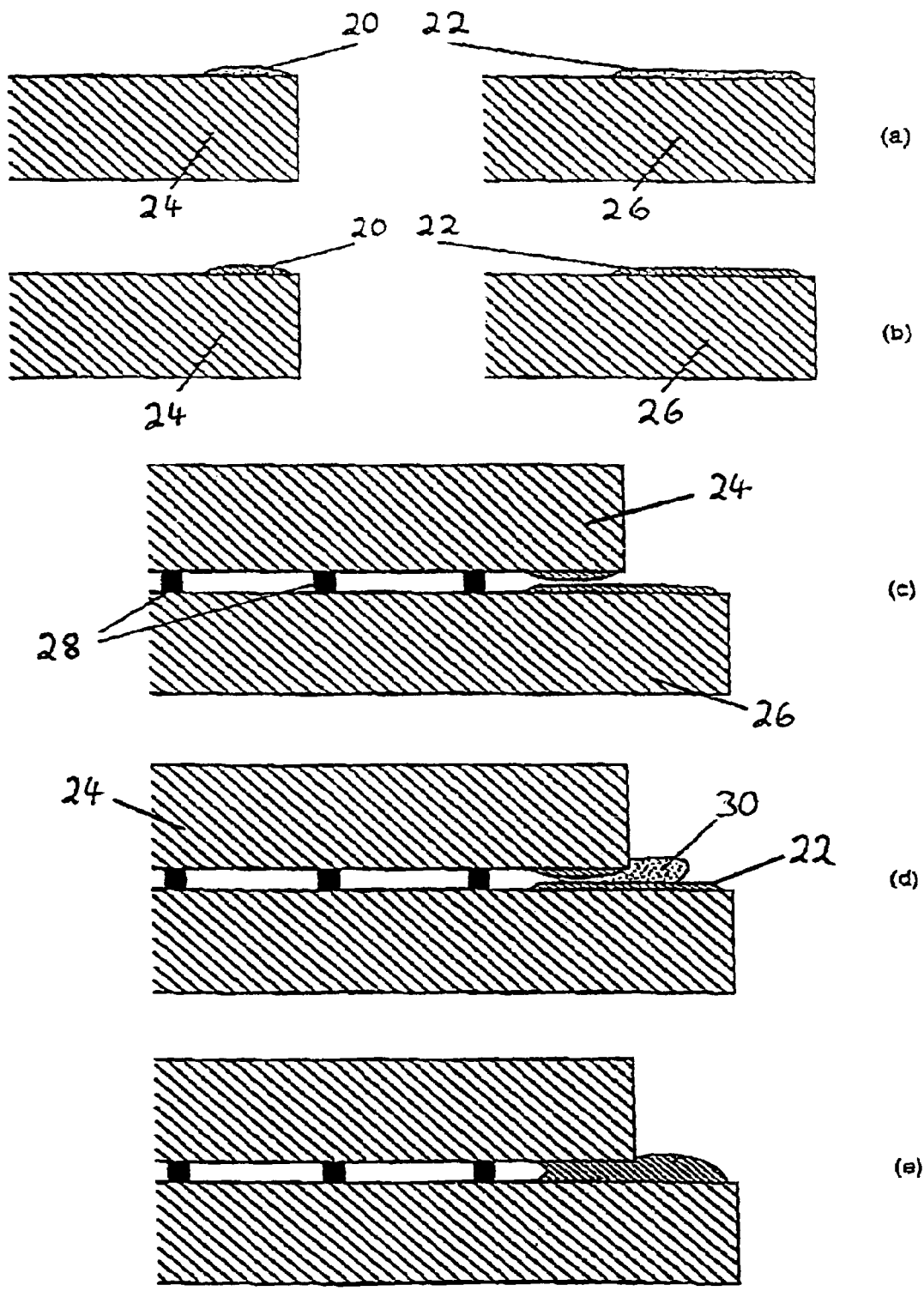
FIG. 2 is a schematic drawing illustrating another method of forming a glass panel embodying the present invention.

Turning now to FIG. 2 (a), in an alternative embodiment, marginal bands of solder glass 20, 22 are deposited on to glass sheets 24, 26, respectively, with the band of solder glass 22 on one of the sheets 26 being wider than the other. The glass sheet 26 is dimensioned to exceed a width of the glass sheet 24 at any point around the periphery of glass sheet 24.

Both sheets 24, 26 are then tempered and during the tempering process, hermetic bonds are formed between the bands of solder glass 20, 22 and the glass sheets 24, 26, respectively (see FIG. 2(b)).

The sheets 24, 26 are then assembled into a configuration as illustrated in FIG. 2(c), with the bottom sheet 26 protruding the upper sheet 24 at any point around the circumference of glass sheet 24. In the configuration illustrated in FIG. 2(c), an array of support pillars 28 is provided between the glass sheets 24, 26 with a combined thickness of the bands of solder glass 20, 22 being slightly less than a height of the support pillars 28.

Next, a further band of solder glass 30 in a liquid paste form is deposited around the periphery of the upper glass sheet 24, on top of the band of solder glass 22, as illustrated in FIG. 2(d).

The entire structure is then subjected to a second heating process during which the band of solder glass 30 is softened and melted to fuse both to itself to form an impermeable layer, and to each of the bands of solder glass 20, 22 (FIG. 2(e)). This melting and fusing operation takes place at a substantially lower temperature, and over a shorter time, than is necessary to form a hermetic bond between the solder glass 20, 22 and the glass sheets 24, 26 directly (FIG. 2(b)).

In this embodiment, the final separation of the glass sheets 24, 26 is "automatically" controlled to be equal to the height of the support pillars 16, without having to allow for sufficient deformation of the bands of the solder glass 10 to ensure "complete" lowering of the upper sheet 14 as described for the other embodiment (see FIG. 1).

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example, the further solder glass band used for forming an hermetic seal between the pre-deposited bands of solder glass on both glass sheets does not necessarily require one of the glass sheets to be larger than the other. Rather, the further solder glass band may be deposited "directly" on the peripheral side of equally dimensioned glass sheets in the area between the glass sheets.

As another example, the further solder glass can be the same solder glass as used for the pre-deposited solder glass bands, or may be a different solder glass with different specifications.

The invention claimed is:

1. A panel which comprises:
   two confronting glass sheets, each glass sheet having a respective band of solder glass, the bands being positioned on top of each other;
   an interdiffusion bond between each band of solder glass and its respective glass sheet; and
   a melt bond between the bands.

2. A panel as claimed in claim 1, wherein the glass sheets are hermetically edge-sealed together by the bands of solder glass.

3. A panel as claimed in claim 1, wherein each of the bands of solder glass extend around the margin of an associated surface of their respective glass sheet.

4. A panel as claimed in claim 3, wherein each of the bands of solder glass are hermetically bonded to the associated surface of each respective glass sheet.

5. A panel as claimed in claim 1, wherein the glass sheets have a spaced-apart confronting relationship.

6. A panel as claimed in claim 5, wherein support pillars maintain the glass sheets in the spaced apart relationship.

7. A panel as claimed in claim 1 wherein the melt bond comprises a further band of solder glass.

8. A panel as claimed in claim 1, wherein at least one of the glass sheets is tempered.

9. A panel as claimed in claim 1, further comprising an evacuated hermetically sealed space defined between the two glass sheets.

10. A panel as claimed in claim 1, wherein the glass sheets are flat.

11. A panel as claimed in claim 1, wherein the glass sheets are curved.

12. A panel as claimed in claim 1, wherein one of the glass sheets is larger than the other.

13. A panel as claimed in claim 1, wherein the glass sheets are of equal dimension.

14. A panel as claimed in claim 1, wherein the panel is a vacuum glazing panel.

* * * * *